(12) United States Patent
Yokoyama

(10) Patent No.: US 8,305,908 B2
(45) Date of Patent: Nov. 6, 2012

(54) SYSTEM ANALYSIS METHOD, SYSTEM ANALYSIS APPARATUS, AND COMPUTER READABLE STORAGE MEDIUM STORING SYSTEM ANALYSIS PROGRAM

(75) Inventor: Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 12/698,580

(22) Filed: Feb. 2, 2010

(65) Prior Publication Data
US 2010/0238820 A1 Sep. 23, 2010

(30) Foreign Application Priority Data
Mar. 17, 2009 (JP) ................. 2009-063814

(51) Int. Cl.
*H04L 1/00* (2006.01)
(52) U.S. Cl. .............. 370/242; 370/211; 370/252
(58) Field of Classification Search ............ 370/252, 370/216–228, 241, 242
See application file for complete search history.

(56) References Cited

U.S. PATENT DOCUMENTS
6,041,042 A * 3/2000 Bussiere ............... 370/245
2005/0289231 A1 12/2005 Harada et al.
2007/0214257 A1 9/2007 Kurita

FOREIGN PATENT DOCUMENTS
JP 2006-11683 1/2006
JP 2007-241805 9/2007

\* cited by examiner

*Primary Examiner* — Gary Mui
(74) *Attorney, Agent, or Firm* — Staas & Halsey LLP

(57) ABSTRACT

An apparatus for analyzing system identifies plural combinations of downlink packet and uplink packet immediately following the downlink packet under predetermined condition, the uplink packet having a predetermined threshold value or more difference time from the received time of the downlink packet to the received time of the uplink packet. And the apparatus calculates chunk processing time by using a difference between the received time of the identified uplink packet and the received time of the identified downlink packet, which are between the time when the packet of a specific processing request to the lower-level server is received and the time when the packet of the response corresponding to the specific processing request is received, and calculates the total sum of the chunk processing times.

6 Claims, 17 Drawing Sheets

FIG. 3A

| RECEIVED TIME | TRANSACTION ID | PROTOCOL | MESSAGE TYPE | OBJECT/RESPONSE TIME |
|---|---|---|---|---|
| 00:00:00:010 | 5 | HTTP | Request | corba/servlet/Balance |
| 00:00:00:012 | 5 | IIOP | Request | Mbalance |
| 00:00:00:013 | 6 | HTTP | Request | corba/servlet/Deposit |
| 00:00:00:016 | 3 | HTTP | Response | 0.008 |
| 00:00:00:020 | 7 | HTTP | Request | corba/servlet/Balance |
| 00:00:00:022 | 5 | IIOP | Response | 0.010 |
| ... | ... | ... | ... | ... |

FIG. 3B

| RECEIVED TIME | TRANSACTION ID | PROTOCOL | MESSAGE TYPE | OBJECT/RESPONSE TIME |
|---|---|---|---|---|
| 00:00:00:030 | 8 | HTTP | Request | corba/servlet/Balance |
| 00:00:00:032 | 8 | IIOP | Request | Mbalance |
| 00:00:00:040 | 8 | IIOP | Response | 0.008 |
| 00:00:00:043 | 8 | HTTP | Response | 0.013 |

FIG. 4

| TRANSACTION ID | MODEL ID | HTTP REQUEST TIME | HTTP RESPONSE TIME | IIOP REQUEST TIME | IIOP RESPONSE TIME |
|---|---|---|---|---|---|
| 1 | 1 | 00:00:00:000 | 00:00:00:010 | 00:00:00:002 | 00:00:00:008 |
| 2 | 10 | 00:00:00:003 | 00:00:00:012 | 00:00:00:008 | 00:00:00:010 |
| ... | ... | ... | ... | ... | ... |

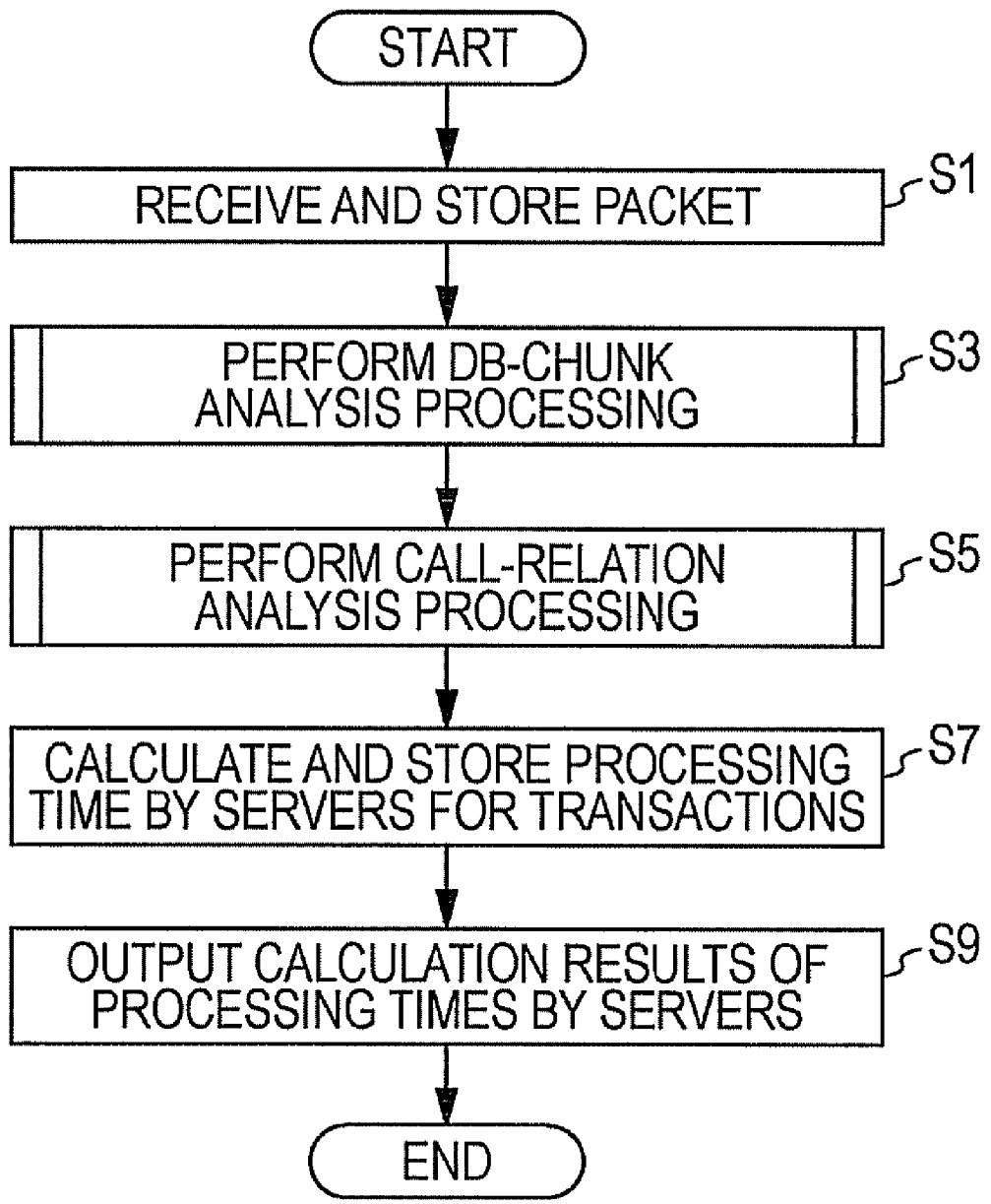

| RECEIVED TIME | FRAME LENGTH |
|---|---|
| FRAME ||
| RECEIVED TIME | FRAME LENGTH |
| FRAME ||
| ⋮ ||

| RECEIVED TIME | CHUNK ID | TYPE |
|---|---|---|
| 00:00:00:000 | 1-1 | Begin |
| 00:00:00:001 | 1-1 | End |
| 00:00:00:002 | 1-2 | Begin |
| 00:00:00:004 | 2-1 | Begin |
| 00:00:00:006 | 2-1 | End |
| 00:00:00:007 | 2-2 | Begin |
| 00:00:00:009 | 1-2 | End |
| 00:00:00:012 | 2-2 | End |
| ⋮ | ⋮ | ⋮ |

FIG. 8

| TRANSACTION ID | MODEL ID | HTTP REQUEST TIME | HTTP RESPONSE TIME | IIOP REQUEST TIME | IIOP RESPONSE TIME | PROCESSING TIME BY DB SERVER |
|---|---|---|---|---|---|---|
| 1 | 1 | 00:00:00:000 | 00:00:00:010 | 00:00:00:002 | 00:00:00:008 | 5 |
| 2 | 10 | 00:00:00:003 | 00:00:00:012 | 00:00:00:004 | 00:00:00:010 | 4 |
| ... | ... | ... | ... | ... | ... | ... |

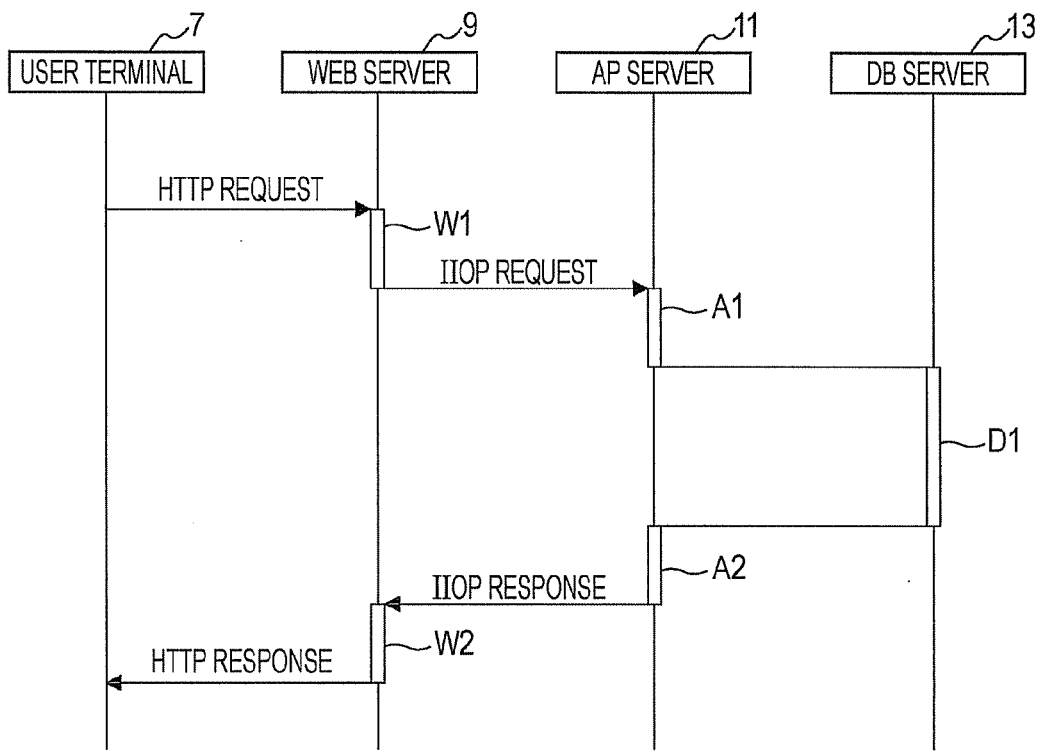

FIG. 16

| CONNECTION NUMBER | SOURCE IP ADDRESS | DESTINATION IP ADDRESS | SOURCE PORT NUMBER | DESTINATION PORTION NUMBER | RECEIVED TIME |
|---|---|---|---|---|---|
| 1 | aaa.bbb.ccc.ddd | eee.fff.ggg.hhh | uuuu | vvvv | 00:00:01:000 |
| 3 | bbb.ccc.ddd.aaa | fff.ggg.hhh.eee | wwww | xxxx | 00:00:01:001 |
| 2 | ccc.ddd.aaa.bbb | ggg.hhh.eee.fff | yyyy | zzzz | 00:00:01:003 |
| ... | ... | ... | ... | ... | ... |

FIG. 17

| CONNECTION NUMBER | CHUNK NUMBER |
|---|---|
| 1 | 6 |
| 2 | 3 |
| 3 | 10 |
| 4 | 2 |
| ... | ... |

FIG. 20

| TRANSACTION ID | CHUNK ID |
|---|---|
| 1 | 1-1, 1-2, 2-1 |
| 2 | 1-2, 2-1, 2-2, 2-3 |
| 3 | 2-3, 3-1, 4-1, 4-2 |
| ⋮ | ⋮ |

FIG. 21

| CHUNK ID | TIME | NUMBER OF ALLOCATIONS |
|---|---|---|
| 1-1 | 1 | 1 |
| 1-2 | 7 | 2 |
| 2-1 | 2 | 2 |
| ⋮ | ⋮ | ⋮ |

SYSTEM ANALYSIS METHOD, SYSTEM ANALYSIS APPARATUS, AND COMPUTER READABLE STORAGE MEDIUM STORING SYSTEM ANALYSIS PROGRAM

CROSS-REFERENCE TO RELATED APPLICATIONS

This application is based upon and claims the benefit of priority of the prior Japanese Patent Application No. 2009-63814, filed on Mar. 17, 2009, the entire contents of which are incorporated herein by reference.

FIELD

The embodiments discussed herein are related to a technology for analyzing an operational status of a system.

BACKGROUND

In a multi-tier system, plural servers having different roles exchange messages so as to operate in cooperation and perform a process based on a request from a client. For example, in a system for online banking or an ordering/order-receiving system in Internet shopping, a 3-tier web system is often used which includes a Web server, an application server (hereinafter called AP server) and a database server (hereinafter called DB server). In general, such a system tends to be large-scale and complicated. Therefore, it is difficult to comprehend the operational status of the entire system, and it is not easy to immediately locate a fault if any, for example.

A technology for analyzing the operational status of such a system has been disclosed. In the technology, packets transmitted and received among servers are collected and contents of the collected packets are analyzed, for example. The correspondence between a request message and response message between servers is identified on the basis of identifiers contained in payloads of the collected packets and is output as a protocol log. On the basis of a set of messages selected in accordance with a selection criteria based on the certainty of caller-called relations between processes, a transaction model satisfying a limiting condition for calls between servers is generated. The processing status of the transaction is analyzed on the basis of the protocol log matching the transaction model.

Japanese Laid-open Patent Publication No. 2006-11683 and Japanese Laid-open Patent Publication No. 2007-241805 are examples of related art.

When the payload of a packet transmitted or received between servers is encrypted, it is difficult to associate using the identifiers a specific request message with a specific response message among plural request messages and plural response messages, for example, and it is difficult to create the transaction model and thus to analyze the operational status of the system.

SUMMARY

According to an aspect of the invention, a computer readable storage medium storing a system analysis program analyzes operational status of the system including plural servers performing processing operations in cooperation in accordance with a request from a user terminal. And the system analysis program causes a computer to execute storing received time of a downlink packet from an upper-level server to a lower-level server for issuing a processing request to the upper-level server in association the downlink packet into a packet storage portion and received time of the uplink packet from the lower-level server to the upper-level server in association the uplink packet into the packet storage portion, identifying plural combinations of the downlink packet and the uplink packet immediately following the downlink packet under predetermined condition, the uplink packet having a predetermined threshold value or more difference time from the received time of the downlink packet to the received time of the uplink packet, storing the received time of the uplink packet included in the identified combination and the received time of the downlink packet included in the identified combination following immediately after the identified combination in association with a chunk identification data into a chunk data storing portion, the chunk identification data identifying a chunk data from the uplink packet included in the identified combination to the downlink packet included in the identified combination following immediately after the identified combination, identifying from the chunk data storing portion the chunk identification data associated with both of the received time of the uplink packet and the received time of the downlink packet, which are included between the time when the packet of a specific processing request to the lower-level server is received and the time when the packet of the response corresponding to the specific processing request is received, storing the identified chunk identification data into an inclusion relation data storing portion in association with a processing identification data for identifying a specific processing operation to be performed in response to the specific processing request, calculating chunk processing time by using a difference between the received time of the uplink packet and the received time of the downlink packet, which are stored in the chunk data storing portion, on the basis of the chunk identification data associated with the processing identification data, calculating the total sum of the chunk processing times to calculate processing time of the upper-level server for the specific processing operation, and storing the total sum of the chunk processing times into an analysis result storing portion in association with the processing identification data of the specific processing operation.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3A is a diagram illustrating an example of the data to be stored in a protocol log storing portion, and FIG. 3B is a diagram illustrating an example of the data to be store in a model storing portion.

FIG. 4 is a diagram illustrating an example of the data to be stored in a transaction data storing portion.

FIG. 5 is a diagram illustrating a processing flow of processing in the system analysis apparatus.

FIG. 8 is a diagram illustrating an example of the data to be stored in an analysis result storing portion.

FIG. 9 is a schematic diagram for explaining a calculation method for processing times by servers.

FIG. 10 is a diagram illustrating an example of the data to be store in a calculation result storing portion.

FIG. 16 is a diagram illustrating an example of the data to be stored in a connection management data storing portion.

FIG. 17 is a diagram illustrating an example of the data to be stored in a chunk number storing portion.

FIG. 20 is a diagram illustrating an example of the data to be stored in an inclusion relation data storing portion.

FIG. 21 is a diagram illustrating an example of the data to be stored in an allocated data storing portion.

DESCRIPTION OF EMBODIMENTS

Figure 1:
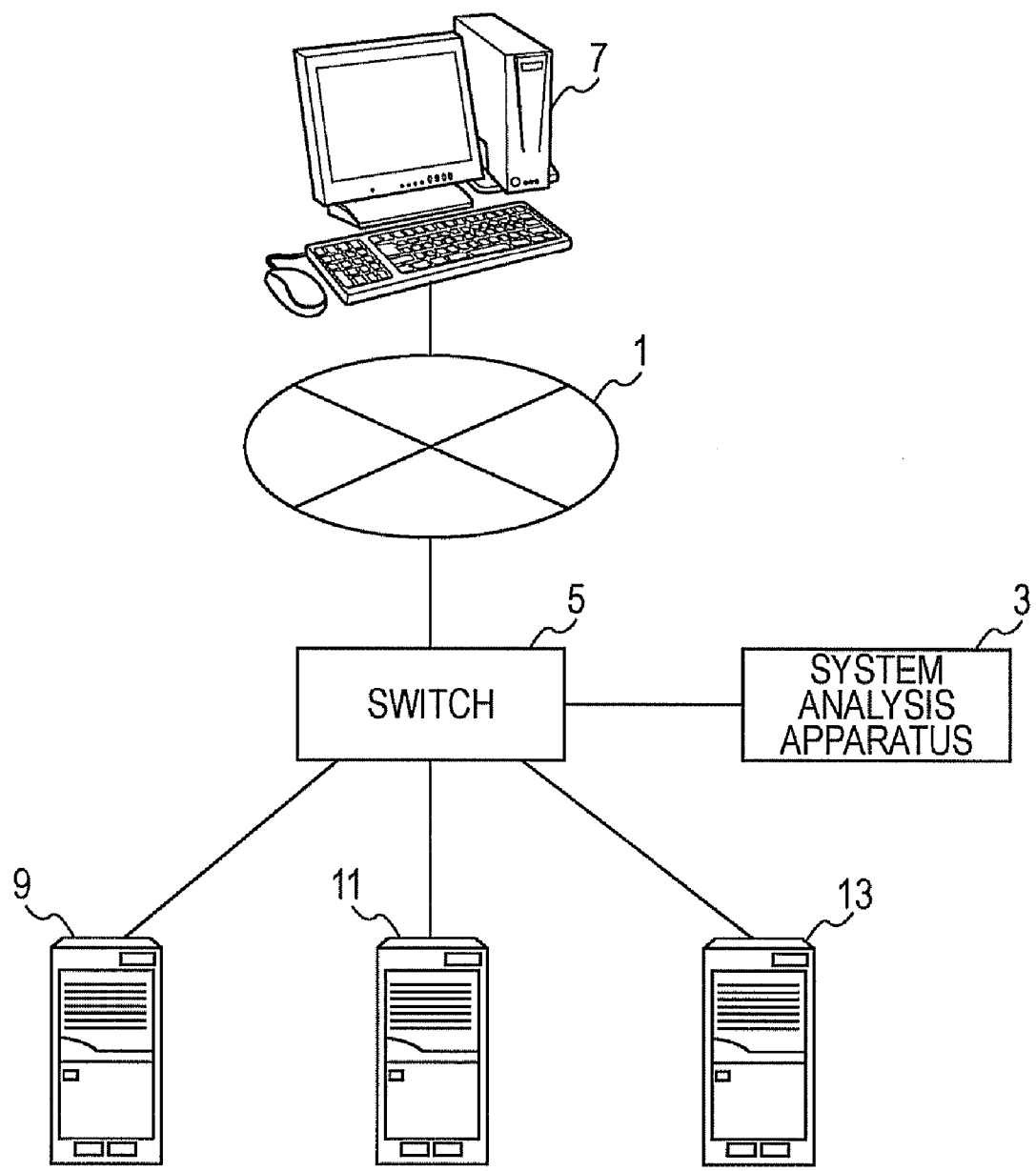
FIG. 1 is a configuration diagram of a system according to an embodiment.

FIG. 1 illustrates a configuration diagram of a system according to this embodiment. For example, to a network 1 being the Internet, a user terminal 7 and a switch 5 being a router, for example, are connected. To the switch 5, a system analysis apparatus 3 that performs main processing in this embodiment, a Web server 9, an AP server 11, and a DB server 13 are connected. Illustrating only one user terminal 7, Web server 9, AP server 11 and DB server 13 here, the numbers are not limited.

The system including the Web server 9, AP server 11 and DB server 13 is what is called a 3-tier web system. When the user terminal 7 issues a request for a processing operation to the Web server 9, the Web server 9, AP server 11 and DB server 13 exchange messages to perform the processing operation in cooperation and returns the response to the request to the user terminal 7. The user terminal 7 and Web server 9 (which will be called CL-WB hereinafter) may communicate by HTTP (Hypertext Transfer Protocol), for example. The Web server 9 and AP server 11 (which will be called WB-AP hereinafter) may communicate by IIOP (Internet Inter-ORB Protocol), for example. The AP server 11 and DB server 13 (which will be called AP-DB hereinafter) may communicate by the protocol based on the specifications of the DB server 13. The system analysis apparatus 3 can receive a packet passing through the switch 5 by port mirroring, for example.

Figure 2:
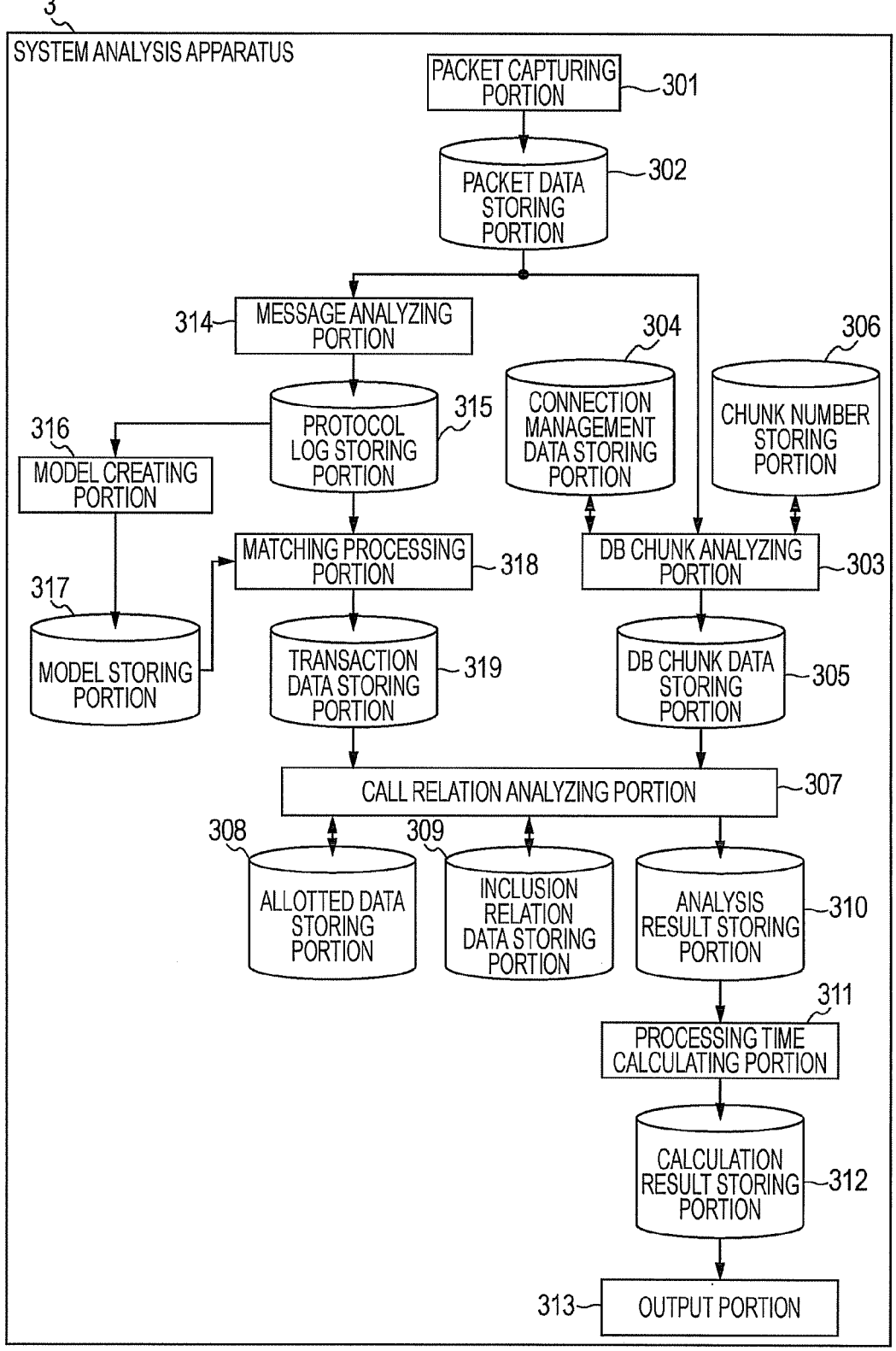
FIG. 2 is a functional block diagram of a system analysis apparatus.

FIG. 2 illustrates a functional block diagram of the system analysis apparatus 3. The system analysis apparatus 3 includes the following processing portions and data storing portions. The system analysis apparatus 3 includes a packet capturing portion 301 that receives a packet from the switch 5, a packet data storing portion 302 that stores the received packet, a DB chunk analyzing portion 303 that performs DB chunk analysis processing, which will be described later, a connection management data storing portion 304 that stores connection management data created by the DB chunk analyzing portion 303, a DB chunk data storing portion 305 that stores an analysis result by the DB chunk analysis processing, a chunk number storing portion 306 that stores a chunk number for creating a chunk ID, a call relation analyzing portion 307 that performs call relation analysis processing, which will be described later, an allocated data storing portion 308 that stores allocated data created by the call relation analyzing portion 307, an inclusion relation data storing portion 309 that stores inclusion relation data created by the call relation analyzing portion 307, an analysis result storing portion 310 that stores an analysis result by the call relation analysis processing, a processing time calculating portion 311 that calculates the processing times by the Web server 9 and AP server 11, a calculation result storing portion 312 that stores the result calculated by the processing time calculating portion 311, an output unit 313 that outputs the result stored in the calculation result storing portion 312 to a display device, a message analyzing portion 314 that analyzes the content of the packet read from the packet data storing portion 302 and stores the analysis result to the protocol log storing portion 315, a protocol log storing portion 315 that stores the analysis result by the message analyzing portion 314, a model creating portion 316 that creates a transaction model on the basis of the data stored in the protocol log storing portion 315, a model storing portion 317 that stores the transaction model created by the model creating portion 316, a matching processing portion 318 that analyzes the processing state of a transaction on the basis of the data stored in the protocol log storing portion 315 and the transaction model stored in the model storing portion 317, and a transaction data storing portion 319 that stores the analysis result by the matching processing portion 318.

The processing to be performed by the message analyzing portion 314, protocol log storing portion 315, model creating portion 316, model storing portion 317, matching processing portion 318 and transaction data storing portion 319 is similar to the processing disclosed in Japanese Laid-open Patent Publication No. 2006-11683, for example. According to this embodiment, the technology in the past is used to perform processing on packets between CL-WB and between WB-AP. Since the details will be described in Japanese Laid-open Patent Publication No. 2006-11683, the processing will be described just briefly.

The message analyzing portion 314 may associate a request message and response message on the basis of the transaction ID, for example, contained in the payload of a packet and stores the analysis result in the protocol log storing portion 315. An example of the data to be stored in the protocol log storing portion 315 is illustrated in FIG. 3A. The example in FIG. 3A includes a column for a received time, a column for a transaction ID, a column for a protocol, a column for a message type, and a column for an object/response time. The column for an object/response time stores an object name for identifying details of a processing operation if it is a request message or the difference from the received time of the corresponding request message if it is a response message. The term "received time" refers to the time when the packet capturing portion 301 has received the packet, and the same is true in the following descriptions.

The model creating portion 316 creates a transaction model on the basis of the data stored in the protocol log storing portion 315 and stores it in the model storing portion 317. For example, by extracting a transaction that has finished the entire processing operation without interference by other transactions, the model creating portion 316 creates a transaction model. An example of the data to be store in the model storing portion 317 is illustrated in FIG. 3B. The example in FIG. 3B includes a column for a received time, a column for a transaction ID, a column for a protocol, a column for a message type, and a column for an object/response time. For example, such a transaction model is created for each type of transaction identified by its object name. The created model is assigned a model ID.

The matching processing portion 318 compares the data stored in the protocol log storing portion 315 and the transaction model stored in the model storing portion 317 to analyze the transaction and stores the result to the transaction data storing portion 319. FIG. 4 illustrates an example of the data to be stored in the transaction data storing portion 319. The example in FIG. 4 includes a column for a transaction ID, a column for a model ID, a column for an HTTP request time, a column for an HTTP response time, a column for an IIOP request time, and a column for an IIOP response time.

By performing the processing, transaction data on packets between CL-WB and WB-AP are created.

On the other hand, this embodiment assumes that the packets to be transmitted and received between AP-DB are protected by encryption, for example, and it is difficult to acquire data such as the transaction IDs from the payloads. In this case, since the processing as described above may not be performed on a packet between AP-DB, the processing as will be described later is performed. Then, the processing result by the processing below and the transaction data resulting from the processing above are analyzed together to analyze the operational status of the entire system.

FIG. 5 is a diagram illustrating a processing flow of processing in the system analysis apparatus 3. With reference to FIG. 5, the processing of analyzing a packet between AP-DB in the system analysis apparatus 3 illustrated in FIG. 2 will be described schematically below. First, if the packet capturing portion 301 of the system analysis apparatus 3 receives a packet, the packet capturing portion 301 extracts the payload from the received packet and stores it in the packet data storing portion 302 in association with the information on the received time and the length of the payload (FIG. 5, step S1). Here, the payloads are stored in the packet data storing portion 302 in order of received times.

Figures 6A, 6B, 7:
FIGS. 6A and 6B are diagrams illustrating examples of the data to be stored in a packet data storing portion.
FIG. 7 is a diagram illustrating an example of the data to be stored in a DB chunk data storing portion.

FIG. 6A illustrates an example of the data to be stored in the packet data storing portion 302 when an Ethernet (registered mark) frame is received. As illustrated in FIG. 6A, the packet data storing portion 302 stores the frame after the MAC header in association with the information on the received time and the data of the frame length contained in the MAC header. In other words, as illustrated in FIG. 6B, the part after the MAC header is called frame, and the frame contains an IP header, TCP header and TCP data. The source and destination IP addresses included in the IP header and the source and destination port number included in the TCP header are used in DB chunk analysis processing, which will be described later. The frame part will be called packet, hereinafter.

As described above, a packet between CL-WB and a packet between WB-AP of the frames stored in the packet data storing portion 302 are analyzed by a technology in the past. Then, the result of the analysis is stored in the transaction data storing portion 319.

Referring back to FIG. 5, the DB chunk analyzing portion 303 performs the DB chunk analysis processing (step S3). The DB chunk analysis processing will be described below just briefly, and the processing will be described later in detail with reference to FIG. 14 and FIG. 15.

As described above, since the payload part of a packet to be exchanged between the AP server 11 and DB server 13 is protected by encryption, for example, it is, more accurately speaking, impossible to associate the request and the response. Accordingly, instead of analyzing the payload, the DB chunk analysis processing regards, from the exchange of packets between the AP server 11 and DB server 13, the part having the difference equal to or larger than a predetermined threshold value between the received times of a downlink packet from the DB server 13 to the AP server 11 and an uplink packet from the AP server 11 to the DB server 13 as a delimiter of the processing operation to identify the delimiter of the processing operation. Then, the part from the uplink packet relating to the delimiter of the processing operation to the downlink packet relating to the delimiter of the next processing operation is identified as a DB chunk. Then, the received times, for example, of the uplink packet and downlink packet indicating the DB chunk is stored in the DB chunk data storing portion 305.

FIG. 7 illustrates an example of the data to be store in the DB chunk data storing portion 305. The example in FIG. 7 includes a column for a received time, a column for a chunk ID, and a column for a type. The chunk ID includes a connection number and a chunk number. For example, when the chunk ID is 5-3, the connection number is 5, and the chunk number is 3 (which is the third DB chunk identified in the fifth connection). The type Begin indicates the first packet in a DB chunk (or the packet having the earliest received time), and the type End indicates the last packet in a DB chunk (or the packet having the latest received time).

Then, the call relation analyzing portion 307 performs the call relation analysis processing (step S5). The call relation analysis processing will be described briefly here and will be described in detail later with reference to FIG. 19.

In the call relation analysis, the DB chunk included between the received time of an IIOP request and the received time of the corresponding IIOP response is first identified. For the identified DB chunk, the difference between the received time of the first packet and the received time of the last packet in the DB chunk is used to calculate the chunk processing time, and the total sum of the chunk processing time is calculated and acquired as the processing time by the DB server 13. Then, the analysis result is stored in the analysis result storing portion 310.

FIG. 8 illustrates an example of the data stored in the analysis result storing portion 310. The example in FIG. 8 includes a column for a transaction ID, a column for a model ID, a column for an HTTP request time, a column for an HTTP response time, a column for an IIOP request time, a column for an IIOP response time, and a column for a processing time by a DB server. The data stored in the analysis result storing portion 310 are created from the processing time by the DB server 13 calculated by the call relation analysis processing and the data stored in the transaction data storing portion 319.

Referring back to FIG. 5, the processing time calculating portion 311 calculates the processing times by servers for transactions and stores them in the calculation result storing portion 312 (step S7). More specifically, first, the processing time by the DB server 13 is subtracted from the difference between the IIOP response time and the IIOP request time stored in the analysis result storing portion 310 to calculate the processing time by the AP server 11. The processing time by the AP server 11 and processing time by the DB server 13 are subtracted from the difference between the HTTP response time and the HTTP request time stored in the analysis result storing portion 310 to calculate the processing time by the Web server 9.

FIG. 9 is a schematic diagram for explaining a calculation method for processing times by servers. The calculation method in step S7 will be described more specifically with reference to FIG. 9. In FIG. 9, the time advances from the top downward. The processing time by the DB server 13 calculated by the call relation analysis processing corresponds to D1 in FIG. 9. The processing time by the AP server 11 can be calculated by subtracting D1 from the difference between the IIOP response time and the IIOP request time. This corresponds to the sum of A1 and A2 in FIG. 9 (where the expression "the sum of A1 and A2" is for convenience of description, and the processing times of A1 and A2 are not calculated. The same is true for the Web server 9). The processing time by the Web server 9 is calculated by subtracting the processing time by the AP server 11 and processing time by the DB server 13 from the difference between the HTTP response time and the HTTP request time. This corresponds to the sum of W1 and W2 in FIG. 9.

In this way, the processing times by the servers can be calculated for transactions. FIG. 10 illustrates an example of the data stored in the calculation result storing portion 312. The example in FIG. 10 includes a column for a transaction ID, a column for a processing time by the Web server 9, the column for a processing time by the AP server 11, and a column for the processing time by the DB server 13.

Figure 11:
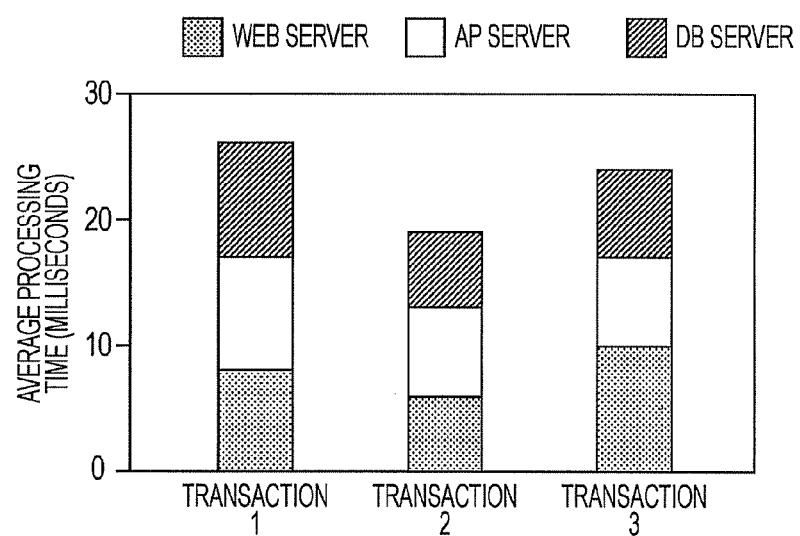
FIG. 11 is a diagram illustrating an example of data to be output.

Referring back to FIG. 5, the output unit 313 outputs the data stored in the calculation result storing portion 312 to the output device such as a display device and a printer (step S9). FIG. 11 illustrates an example of the data to be output. The example in FIG. 11 is bar graphs of average processing times by the servers for a predetermined period of time for types of transaction (such as depositing money and balance inquiry in online banking). The display as illustrated in FIG. 11 may be provided for each transaction ID or may be provided on the basis of a representative numerical value in a measurement period by calculating a statistic such as an average value and a center value for each transaction type. Instead of the display examples, statistic processing in accordance with the purposes may be performed, and the analysis result may further be provided effectively in various display forms, for example. A histogram for a processing time, for example, may be created and output for each server.

Performing the processing above allows analysis of the operational status of the system on the basis of the processing time by the servers calculated by using the calculation result of the processing time by the DB server 13 and transaction data acquired separately.

Next, with reference to FIG. 12 to FIG. 17, the DB chunk analysis processing will be described. As described above, since the payload of a packet between AP-DB is protected by encryption, it is difficult to associate a request message and a response message by using data contained in the payload. Accordingly, the DB chunk analysis processing DB identifies delimiters of processing operations in the server 13 and regards the part from the uplink packet relating to the delimiter of the processing operation to the downlink packet relating to the delimiter of the next processing operation as a processing chunk, by performing the following processing:

Plural connections are generally established among servers, and the packets relating to plural processing operations are transmitted and received in parallel. Without the identification of the delimiters of processing operations on packets on the same connection, packets relating to the processing operations having no relations may be included in one same processing chunk.

Figure 12:
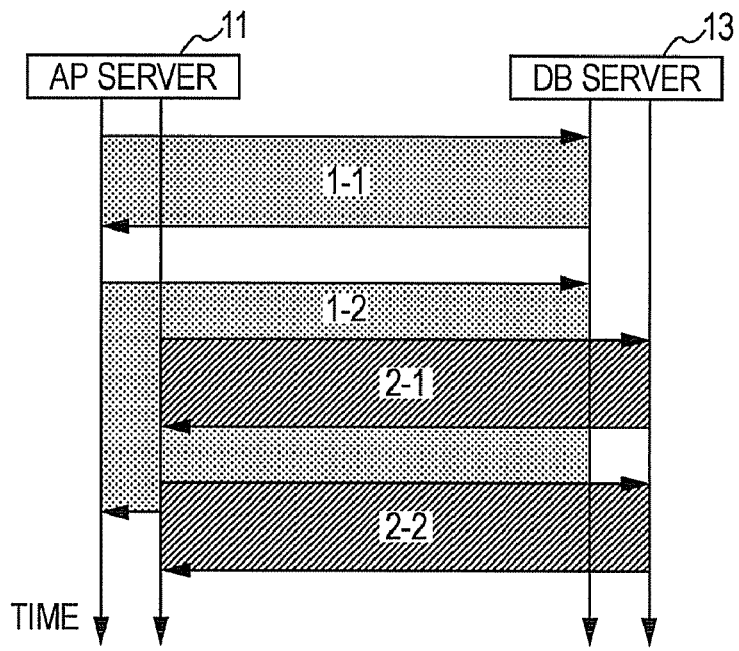
FIG. 12 is a schematic diagram for explaining that processing is performed for each connection.

FIG. 12 is a schematic diagram for explaining that processing is performed for each connection. According to this embodiment, as illustrated in FIG. 12, delimiters of processing operations on packets on a same connection are identified. In FIG. 12, the time advances from the top downward. The AP server 11 and DB server 13 have two downward arrows, which indicate that two connections are established between the AP server 11 and the DB server 13. In the part between the first arrow and the third arrow from the left, packets are transmitted and received on a connection 1. In the part between the second arrow and the fourth arrow, packets are transmitted and received on a connection 2. The shaded rectangular parts are DB chunks, and a chunk ID is given to each of them. Here, on the connection 1, the DB chunk with a chunk ID 1-1 and the DB chunk with a chunk ID 1-2 are identified. On the connection 2, the DB chunk with a chunk ID 2-1 and the DB chunk with the chunk ID 2-2 are identified. The rightward arrow indicates the first packet in the DB chunk, and the leftward arrow indicates the last packet in the DB chunk.

Figure 13:
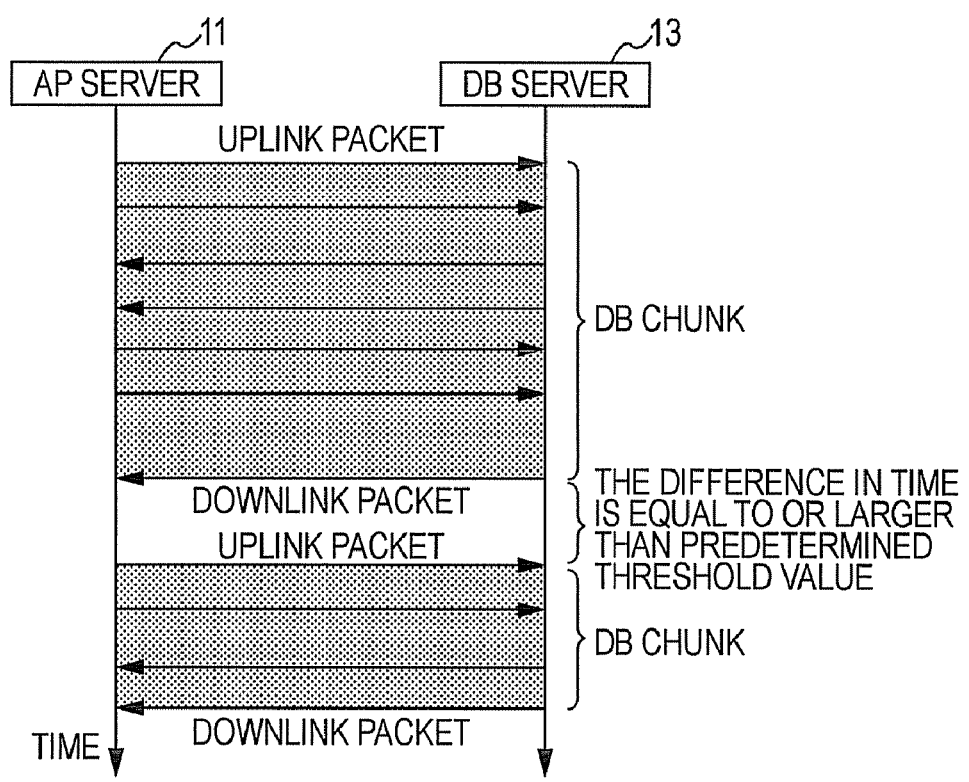
FIG. 13 is a schematic diagram for explaining a method for identifying a delimiter of a processing operation.

FIG. 13 is a schematic diagram for explaining a method for identifying a delimiter of a processing operation. In FIG. 13, the time advances from the top downward. The horizontal arrows indicate exchanges of packets between AP-DB, and the shaded parts indicate DB chunks. As illustrated in FIG. 13, the DB chunk analysis processing regards the part where the difference between the received times of an uplink packet and the immediately preceding downlink packet is equal to or larger than a predetermined threshold value as a delimiter of the processing operation. On the basis of the delimiters of the processing operation, a DB chunk can be identified.

Figure 14:
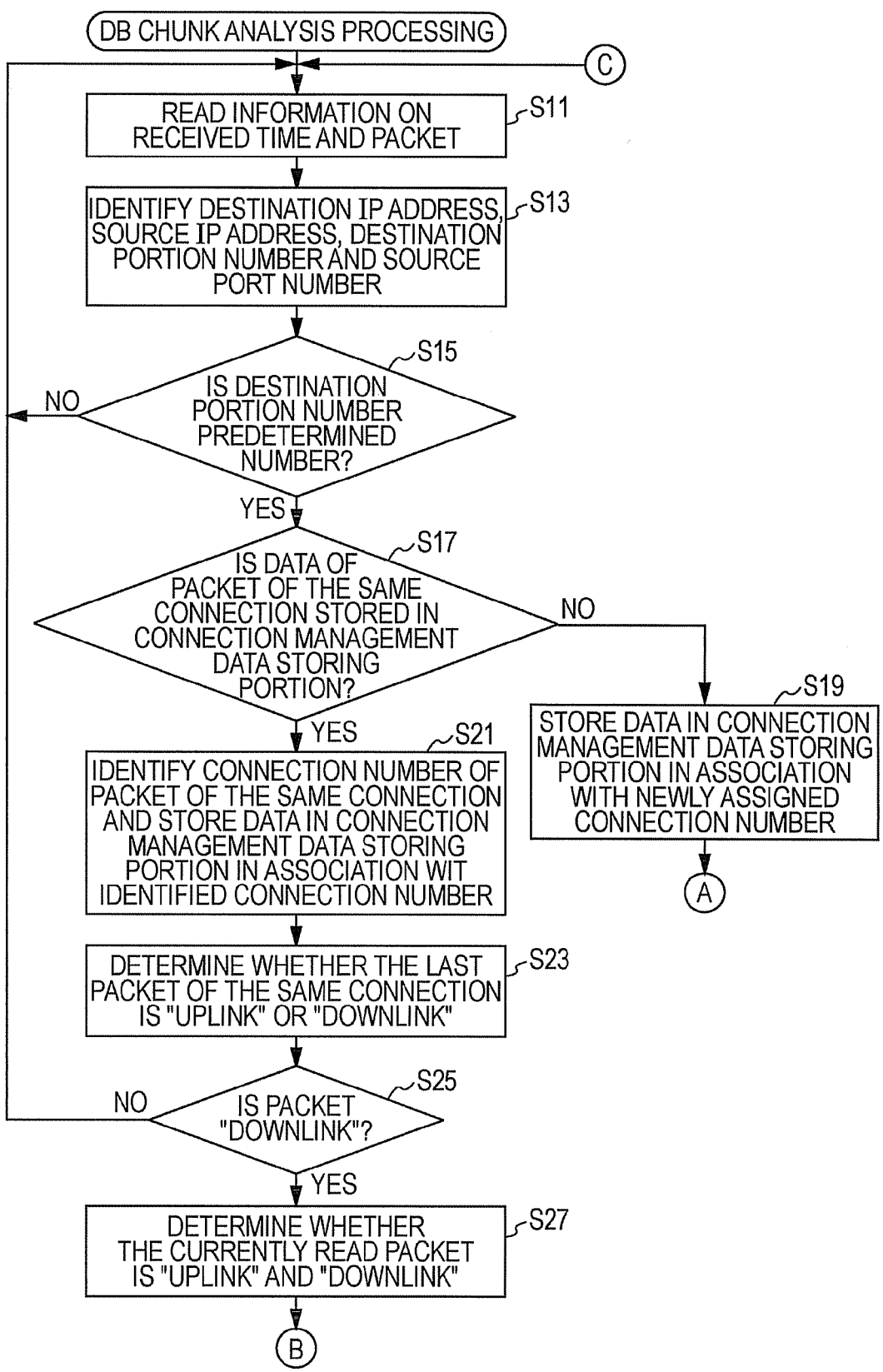
FIG. 14 is a diagram illustrating a processing flow of DB chunk analysis processing.
Figure 15:
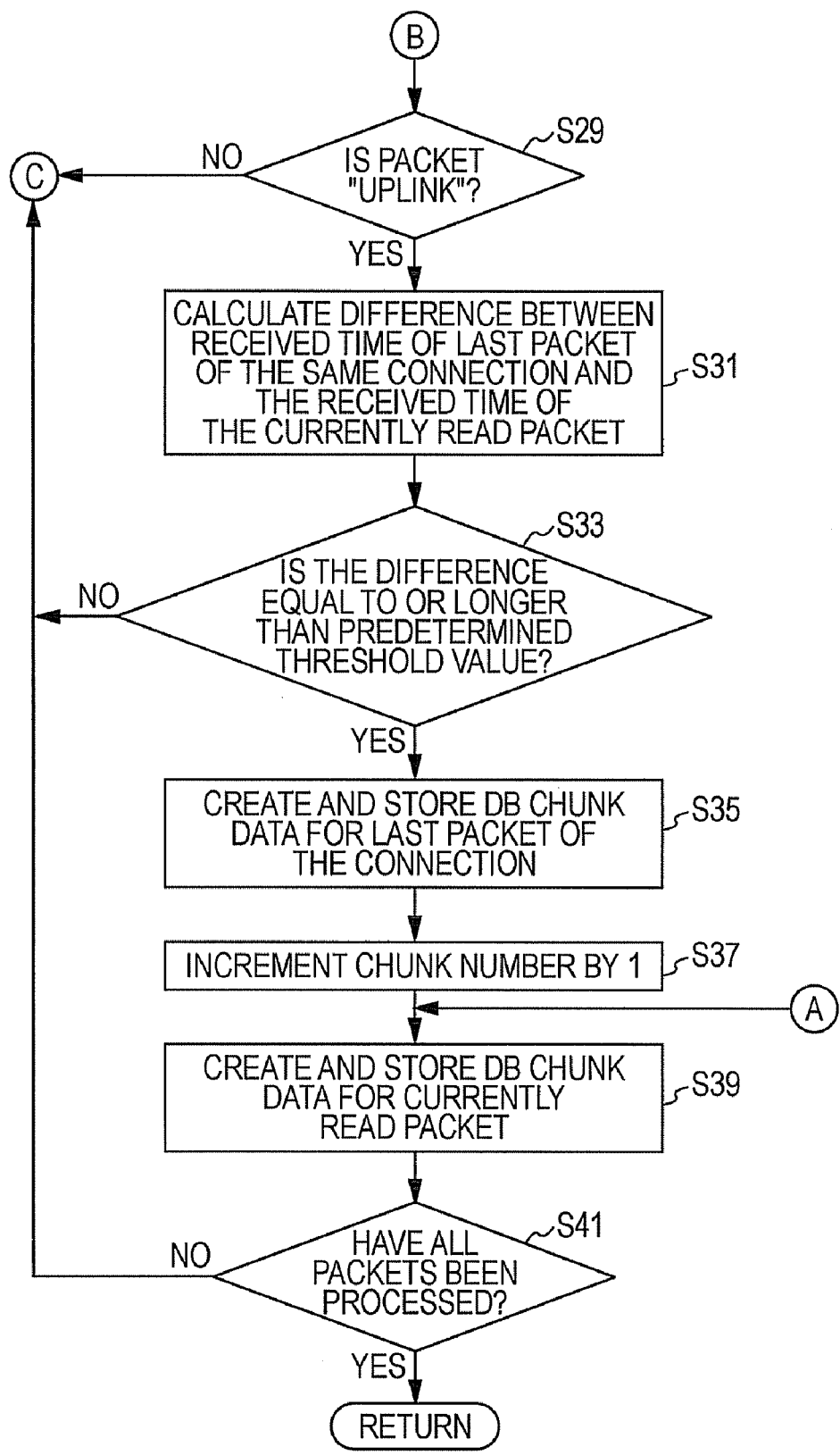
FIG. 15 is a diagram illustrating a processing flow of the DB chunk analysis processing.

Next, with reference to FIG. 14 to FIG. 17, the DB chunk analysis processing will be described in detail. FIG. 14 to FIG. 15 are diagrams illustrating a processing flow of the DB chunk analysis processing. First of all, the DB chunk analyzing portion 303 reads one unprocessed packet and information on the received time of the packet from the packet data storing portion 302 (FIG. 14, step S11). As described above, the packet data storing portion 302 stores packets in order of the received times. Thus, in step S11, unprocessed packets are read in order of the received times.

Then, the DB chunk analyzing portion 303 refers to the IP header and TCP header of the read packet and identifies the source IP address and the destination IP address, and the source port number and destination port number therefrom (step S13).

Then, the DB chunk analyzing portion 303 determines whether the destination port number is a predetermined number or not (step S15). Here, whether it is the number indicating the communication with the DB server 13 or not is determined. This is because only the packets between AP-DB undergo the following processing. If the destination port number is not the predetermined number (No in step S15), the processing returns to step S11 to perform the processing on the next packet.

On the other hand, if the destination port number is the predetermined number (Yes in step S15), the DB chunk analyzing portion 303 determines whether the data in the packet on the same connection as the connection relating to the packet read in step S11 is stored in the connection management data storing portion 304 or not (step S17). If the data in the packet on the same connection is not stored in the connection management data storing portion 304 (No in step S17), the DB chunk analyzing portion 303 newly assigns a connection number to the packet read in step S11, and, in association with the connection number, stores the information on the destination IP address, source IP address, destination port number, source port number and received time in the connection management data storing portion 304 (step S19). In step S19, in association with the newly assigned connection number, a chunk number "1" is stored in the chunk number storing portion 306. In other words, when a new connection is established, the corresponding record is created in the chunk number storing portion 306. Then, the processing moves to step S39 in FIG. 15.

FIG. 16 illustrates an example of the data to be stored in the connection management data storing portion 304. The example in FIG. 16 includes a column for a connection number, a column for a source IP address, a column for a destination IP address, a column for a source port number, a column for a destination port number, and a column for a received time. Even when only one AP server 11 and one DB server 13 are provided, the connection can be distinguished because the port number of the AP server 11 side is different.

FIG. 17 illustrates an example of the data to be stored in the chunk number storing portion 306. The example in FIG. 17 includes a column for a connection number and a column for a chunk number. The chunk number is the number of DB chunks indentified on a specific connection. For example, since the record on the first line has a connection number 1 and a chunk number 6, five DB chunks have already been identified on the connection 1, and, currently, the processing for identifying the sixth DB chunk is being performed.

Referring back to FIG. 14, if the data in packets relating to the same connection are stored in the connection management data storing portion 304 (Yes in step S17), the DB chunk analyzing portion 303 identifies the connection number of the packets relating to the same connection, and, in association with the identified connection number, stores the information on the destination IP address, source IP address, destination port numbers, source port numbers and received times identified in step S13 to the connection management data storing portion 304 (step S21).

Then, the DB chunk analyzing portion 303 identifies the data of the immediately preceding packet (or the packet with the latest received time) of the packets relating to the same connection from the connection management data storing portion 304 and determines whether the immediately preceding packet is "uplink" or "downlink" (step S23). Here, the term "uplink" refers to a packet transmitted from the AP server 11 to the DB server 13, and the term "downlink" refers to a packet transmitted from the DB server 13 to the AP server 11. Either "uplink" or "downlink" may be determined on the basis of the destination IP address, for example.

If the immediately preceding packet of the packets relating to the same connection is not "downlink" (No in step S25), the processing returns to step S11 to perform processing on the next packet. On the other hand, if the immediately preceding packet of the packets relating to the same connection is "downlink" (Yes in step S25), the DB chunk analyzing portion 303 determines whether the packet read in step S11 is "uplink" or "downlink" (step S27). The processing moves to step S29 in FIG. 15.

Next, referring to FIG. 15, if the DB chunk analyzing portion 303 determines that the packet read in step S11 is not "uplink" (No in step S29), the processing returns to step S11 in FIG. 14 to perform the processing on the next packet. On the other hand, if the packet read in step S11 is "uplink" (Yes in step S29), the DB chunk analyzing portion 303 calculates the difference between the received times of the immediately preceding packet and the packet read in step S11 of the packets relating to the same connection (step S31). Then, the DB chunk analyzing portion 303 determines whether the calculated difference is equal to or larger than the predetermined threshold value or not (step S33).

If the DB chunk analyzing portion 303 determines that the calculated difference is smaller than the predetermined threshold value (No in step S33), the processing returns to step S11 in FIG. 14 to perform the processing on the next packet.

On the other hand, if the calculated difference is equal to or larger than the predetermined threshold value (Yes in step S33), the DB chunk analyzing portion 303 creates DB chunk data containing the information on the received time, the type End and the chunk ID for the immediately preceding packet of the packets relating to the same connection, and stores the DB chunk data to the DB chunk data storing portion 305 (step S35). The chunk ID includes the connection number identified in step S21 and the chunk number stored in the chunk number storing portion 306 in association with the connection number. Then, the DB chunk analyzing portion 303 increments by one the chunk number stored in the chunk number storing portion 306 in association with the connection number identified step S21 (step S37).

Then, the DB chunk analyzing portion 303 creates the DB chunk data containing the information on the received time, the type Begin and the chunk ID for the packet read in step S11 and stores the DB chunk data to the DB chunk data storing portion 305 (step S39). The chunk ID includes the connection number identified in step S19 or step S21 and the chunk number stored in the chunk number storing portion 306 in association with the connection number. Notably, the first packet stored in the packet data storing portion 302 may not be the first packet of the DB chunk. However, according to this embodiment, since it is difficult to check whether a given packet is the first one or not, the first DB chunk is not used for the following processing.

Then, the DB chunk analyzing portion 303 determines whether all of the packets stored in the packet data storing portion 302 have been processed or not (step S41). If all of the packets have not been processed (No in step S41), the processing returns to step S11 in FIG. 14 to perform the processing on the next packet. On the other hand, if all of the packets have been processed (Yes in step S41), the processing returns to the beginning.

Performing the processing as described above allows identification of a processing chunk in the DB server 13 even when a transaction ID included in the payload of a packet between AP-DB is not available and it is difficult to associate the request message and the corresponding response message.

The variation examples of the DB chunk analysis processing may include the following processing. For example, first of all, packets between AP-DB are all read from the packet data storing portion 302, and connection numbers are given to the packets. After that, in order from the packet having the earliest received time, the packets relating to the same connection are determined regarding the uplink/downlink relation with the immediately preceding or immediately following packet or whether the difference in received times is equal to or larger than a predetermined threshold value or not. Even performing the processing can provide the same processing result as that of the aforementioned processing.

Next, with reference to FIG. 18 to FIG. 21, the call relation analysis processing will be described. The call relation analysis processing calculates the chunk processing time on the DB chunks each included between the received time of a request message to the AP server 11 and the received time of the corresponding response message and calculates the total sum of the chunk processing times as the processing time by the DB server 13.

Figure 18:
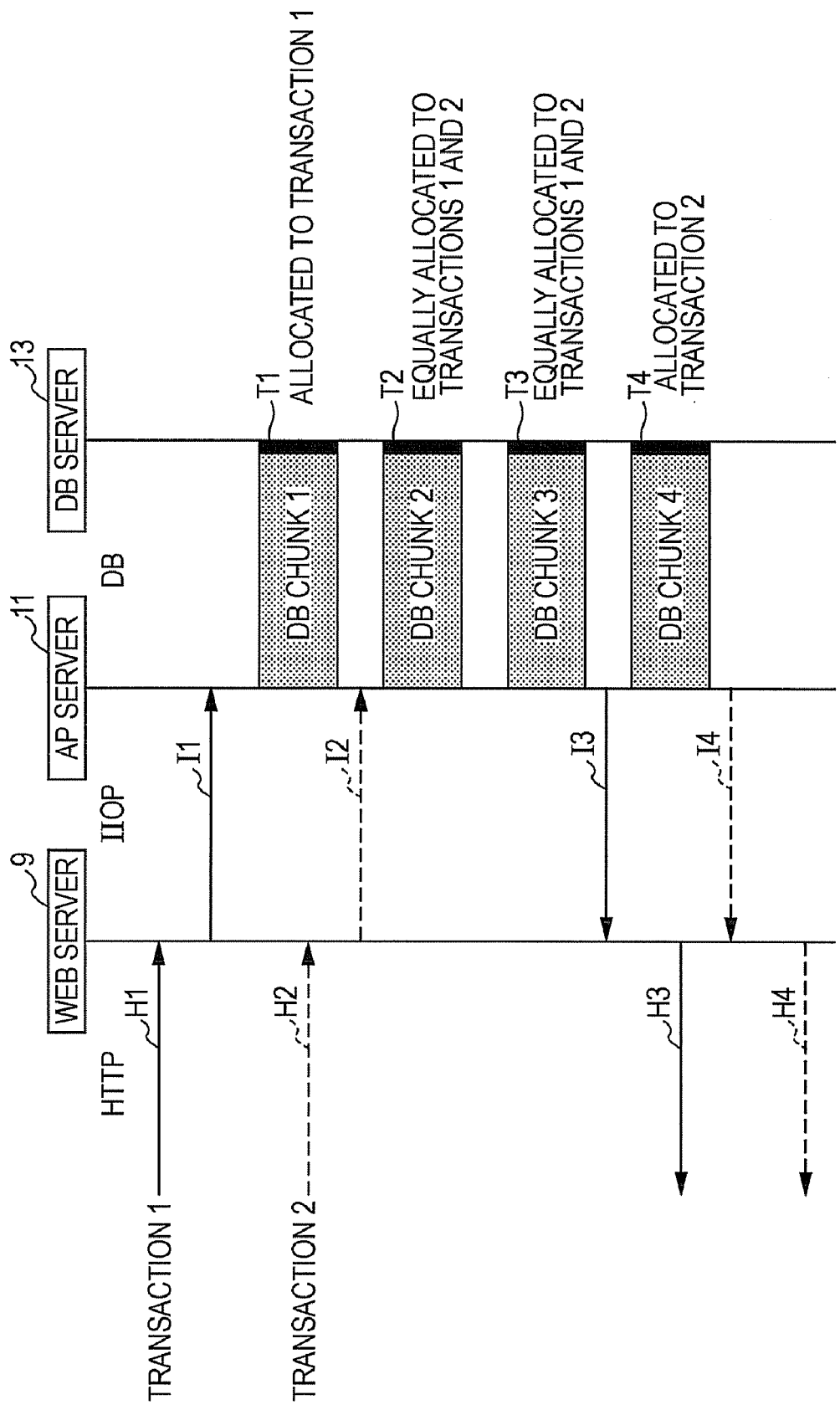
FIG. 18 is a schematic diagram for explaining a method for calculating method for a processing time by a DB server.

FIG. 18 illustrates a schematic diagram for explaining a method for calculating the processing time by the DB server 13. In FIG. 18, the time advances from the top downward. The arrows in the horizontal direction indicate the transmission of messages, and messages relating to a transaction 1 and messages relating to a transaction 2 are indicated by the solid lines and dashed lines, respectively. In the transaction 1, an HTTP response message H3 corresponds to an HTTP request message H1, and an IIOP response message I3 corresponds to an IIOP request message I1. In the transaction 2, an HTTP response message H4 corresponds to an HTTP request message H2, and an IIOP request message I2 corresponds to an IIOP response message I4. Though the request message and the response message are not associated between AP-DB, four DB chunks are identified. The received time of the first packet and the received time of the last packet in a DB chunk 1 have a difference T1. The differences T2, T3 and T4 may be calculated in the same manner.

For example, in order to calculate the processing time by the DB server 13 in the transaction 1, the T1, T2 and T3 are used to calculate the processing time since the DB chunks included between the I1 and the I3 are the DB chunk 1, DB chunk 2 and DB chunk 3. However, the DB chunk 2 and DB chunk 3 are also included between I2 and I4, they may include the processing by the DB server 13 in the transaction 2. For that reason, the processing time by the DB server 13 in the transaction 1 is calculated by T1/1 (=the number of including transactions (which is the transaction 1))+T2/2 (=the number of including transactions (which are the transactions 1 and 2))+T3/2 (=the number of including transactions (which are the transactions 1 and 2)). In other words, the chunk processing time is calculated by dividing the difference between the received time of the first packet and the received time of the last packet in the focused DB chunk by the number of transactions including the focused DB chunk, and the total sum of the chunk processing times is handled as the processing time by the DB server 13. Similarly for the transaction 2, T2/2+T3/2+T4/1 is calculated to acquire the processing time by the DB server 13.

Figure 19:
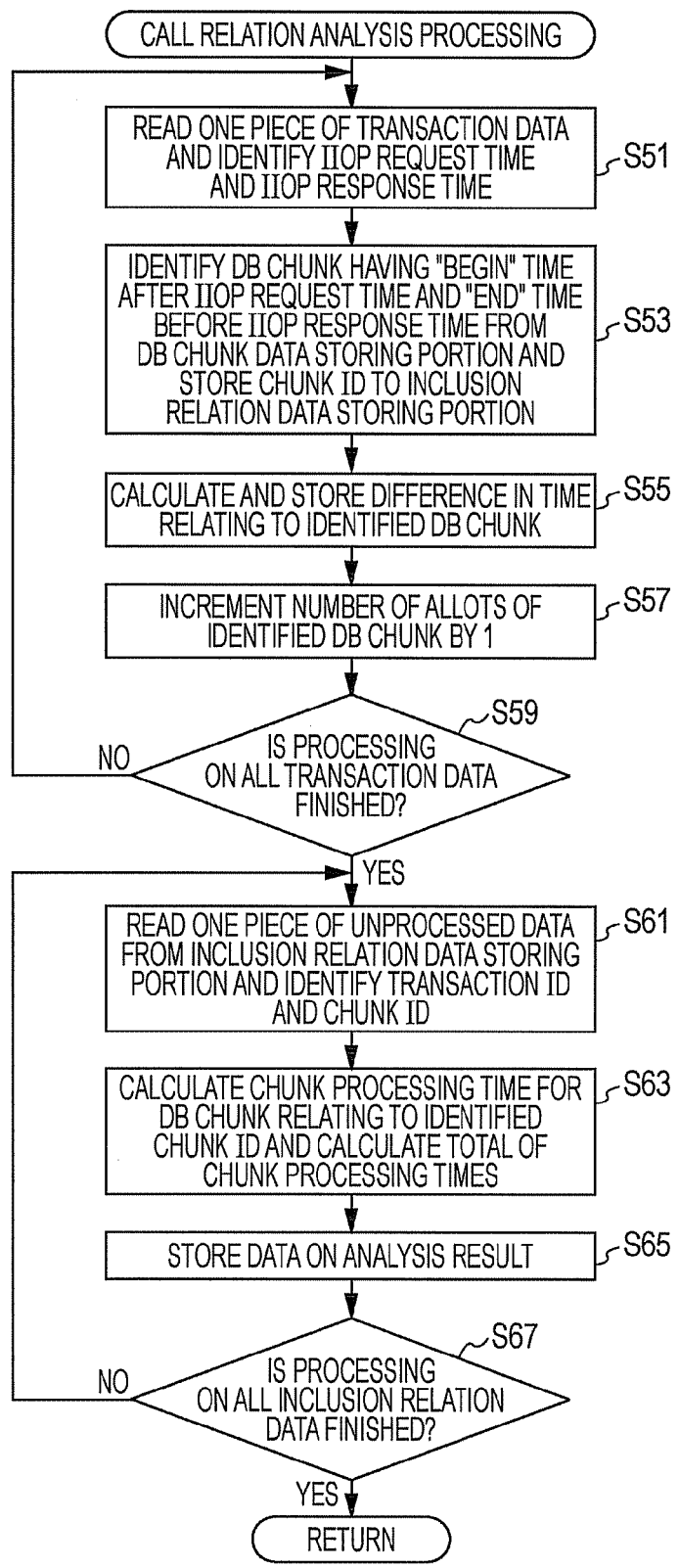
FIG. 19 is a diagram illustrating a processing flow of call relation analysis processing.

Next, with reference to FIG. 19 to FIG. 21, the call relation analysis processing will be described in detail. FIG. 19 is a diagram illustrating a processing flow of call relation analysis processing. First of all, the call relation analyzing portion 307 reads one piece of unprocessed transaction data stored in the transaction data storing portion 319 and identifies the transaction ID, the information on the IIOP request time and the information on the IIOP response time (FIG. 19, step S51). The call relation analyzing portion 307 then identifies the chunk ID of the DB chunk with the received time of the packet having the type "Begin" later than the IIOP request time and with the received time of the packet having the type "End" under the same chunk ID earlier than the IIOP response time from the DB chunk data storing portion 305 and stores the chunk ID in the inclusion relation data storing portion 309 in association with the transaction ID identified in step S51 (step S53).

FIG. 20 illustrates an example of the data to be stored in the inclusion relation data storing portion 309. In the example in FIG. 20, for each transaction ID, the chunk ID or IDs of one or plural DB chunks included in the transaction relating to the transaction ID is or are stored. For example, the record on the first line indicates that the transaction with the transaction ID 1 includes the DB chunk with the chunk ID 1-1, the DB chunk with the chunk ID 1-2, and the DB chunk with the chunk ID 2-1.

Referring back to FIG. 19, the call relation analyzing portion 307 calculates the difference between the received time of the packet with the type "End" and the received time of the packet with the type "Begin", which are stored in the DB chunk data storing portion 305, in association with the chunk ID identified in step S53 and stores the calculation result in the allocated data storing portion 308 in association with the chunk ID (step S55). If plural chunk IDs are identified in step S53, the processing is performed on each of the chunk IDs. Notably, the processing in step S55 is skipped for the DB chunk with the difference already calculated.

FIG. 21 illustrates an example of the data to be stored in the allocated data storing portion 308. The example in FIG. 21 includes a column for a chunk ID, a column for a time, and a column for the number of allocations. The term "time" refers to the difference between the received time of the first packet and the received time of the last packet in a DB chunk. The expression "number of allocations" refers to the number of transactions including a given DB chunk, the initial value of which is "0".

Referring back to FIG. 19, the call relation analyzing portion 307 increments by one the number of allocations stored in the allocated data storing portion 308 in association with the chunk ID identified in step S53 (step S57). When plural chunk IDs are identified in step S53, the processing is performed on each of the chunk IDs. Then, the call relation analyzing portion 307 determines whether all of the transaction data pieces have been processed or not (step S59). If all of the transaction data pieces have not been processed (No in step S59), the processing returns to step S51 to perform the processing on the next transaction data piece.

On the other hand, if all of the transaction data pieces have been processed (Yes in step S59), the call relation analyzing portion 307 reads one piece of unprocessed inclusion relation data from the inclusion relation data storing portion 309 and identifies the transaction ID and one or plural chunk IDs (step S61). Then, the call relation analyzing portion 307 identifies for each of the identified chunk IDs, the time and the number of allocations stored in the allocated data storing portion 308 in association with the corresponding chunk ID, divides the time by the number of allocations to calculate the chunk processing time and calculates the total sum of the chunk processing times as the processing time by the DB server 13 (step S63). This processing is as described with reference to FIG. 18.

Then, the call relation analyzing portion 307 stores the data on the analysis result including the transaction data including the transaction ID identified in step S61 and stored in the transaction data storing portion 319 and the processing time by the DB server 13 calculated in step S63 in the analysis result storing portion 310 (step S65). Since the example of the data stored in the analysis result storing portion 310 has been described above, the description will be omitted.

Then, the call relation analyzing portion 307 determines whether all of the inclusion relation data pieces have been processed or not (step S67). If all of the inclusion relation data pieces have not been processed (No in step S67), the processing returns to step S61 to perform the processing on the next inclusion relation data. On the other hand, if all of the inclusion relation data pieces have been processed (Yes in step S67), the processing returns to the beginning.

Performing the processing as described above allows calculation of the processing time by the DB server 13 for each transaction on the basis of the inclusion relation between the transaction and the DB chunk identified on the basis of the received times, even when it is difficult to analyze the contents of the DB chunks and it is thus difficult to identify the transactions relating to the DB chunks in the DB server 13.

Having described an embodiment of the present art, the present art is not limited thereto. For example, the functional block diagram of the system analysis apparatus 3 may not typically correspond to a real program module configuration.

The aforementioned configurations of the tables are just examples and the tables may not typically have the configurations. In the processing flows, the order of the processing steps may be changed if the same processing results can be provided thereby. The processing steps may be performed in parallel.

While, according to the embodiment, the 3-tier web system including the Web server 9, AP server 11 and DB server 13 is analyzed, the present art is not limited to the embodiment. The present art is applicable to the analysis on systems having tier structures.

While the difference between the received time of the first uplink packet and the received time of the last downlink packet in a DB chunk is equally allocated into transactions including the DB chunk, it may be weighted and may be allocated more or less to a specific transaction, for example.

Having described the example that the chunk ID is created from the corresponding connection number and chunk number like "2-1", for example, the chunk ID may simply be an identification number such as "1", "2" and "3". In this case, instead of the chunk number storing portion 306, a table may be used for managing which identification number is currently used for a connection, for example.

Figure 22:
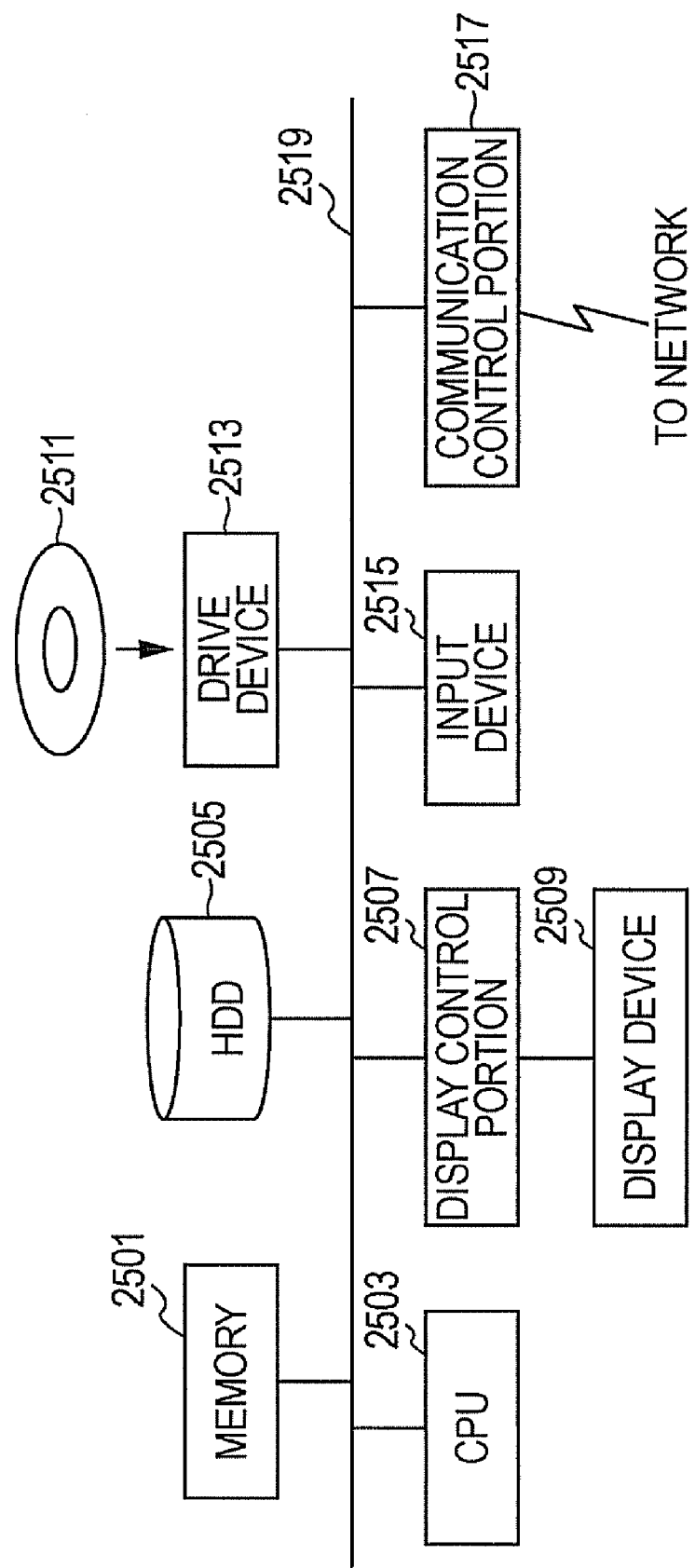
FIG. 22 is a functional block diagram of a computer.

FIG. 22 is a functional block diagram of a computer. The system analysis apparatus 3, user terminal 7, Web server 9, AP server 11 and DB server 13 are connected, as illustrated in FIG. 22, via a bus 2519 to a memory 2501 (which is a storing portion), a CPU 2503 (which is a processing portion), a hard disk drive (or HDD) 2505, a display control portion 2507 connected to a display device 2509, a drive device 2513 for a removable disk 2511, an input device 2515, and a communication control portion 2517 for connecting to a network. The application programs including an OS and a Web browser are stored in the HDD 2505 and are read from the HDD 2505 to the memory 2501 upon execution by the CPU 2503. As required, the CPU 2503 controls the display control portion 2507, communication control portion 2517, and drive device 2513 so as to perform necessary operations. The data being processed is stored in the memory 2501 and may be stored in the HDD 2505 if necessary. The computer may implement the functions as described above with the organic cooperation between hardware such as the CPU 2503 and memory 2501 and a necessary application program such as an OS.

A program causing hardware to execute the processing as described above may be created, and the program may be stored in a computer-readable storage medium such as a flexible disk, a CD-ROM, a magneto-optical disk, a semiconductor memory, and a hard disk or a storage device. Data being processed may be temporarily saved in a storage device such as a memory of a computer.

The embodiment above may be summarized as follows:

A system analysis method is executed by a computer for receiving messages transmitted and received between plural servers performing processing operations in cooperation in accordance with a request from a user terminal 7 and analyzing the operational status of a system. The method includes the steps of (a) identifying plural combinations of a downlink packet being a reference and an uplink packet being the immediately following uplink packet of the downlink packet being the reference and having the received time different from that of the downlink packet being the reference by a predetermined threshold value or more among the uplink packets and downlink packets transmitted and received between an upper-level server and a lower-level server that issues a processing request to the upper-level server among the plural servers, stored in a packet storage portion that stores in association a downlink packet from the upper-level server to the lower-level server and an uplink packet from the lower-level server to the upper-level server and the information on the received time of the downlink packet or uplink packet and satisfying a predetermined condition, (b) storing in a chunk data storing portion the received time of the uplink packet included in the specific combination and the received time of the downlink packet included in the immediately following combination of the specific combination in association with a chunk ID for identifying the chunk from the uplink packet included in a specific combination among the identified combinations to the downlink packet included in the immediately following combination of the specific combination, (c) identifying from the chunk data storing portion the chunk ID of the chunk having both of the received time of the uplink packet and the received time of the downlink packet, which are stored in the chunk data storing portion, included between the time when the packet of a processing request to the lower-level server is received and the time when the packet of the response corresponding to the processing request is received and storing it in an inclusion relation data storing portion in association with the processing ID for identifying the processing to be performed in response to the processing request, (d) calculating the chunk processing time by using a difference between the received time of the uplink packet and the received time of the downlink packet, which are stored in the chunk data storing portion in association with the corresponding chunk IDs, for each of the chunk IDs stored in the inclusion relation data storing portion in association with the processing ID of a specific processing operation performed in response to a specific processing operation request to the lower-level server, and (e) acquiring the total sum of the chunk processing times calculated for the specific processing operation to calculate the processing time by the upper-level server for the specific processing operation and storing it in an analysis result storing portion in association with the processing ID of the specific processing operation.

When the data communication between a lower-level server (which may be the AP server 11 of the embodiment) and an upper-level server (which may be the DB server 13 of the embodiment) is encrypted and it is difficult to acquire data such as a transaction ID, the method, roughly speaking, performs the processing as follows: (1) A processing chunk (which may be a DB chunk of the embodiment) by the upper-level server from the exchange of packets between the lower-level server and the upper-level server is identified (in steps (a) and (b) above). (2) Conversely, a processing chunk by the upper-level server included in the processing chunk (such as a transaction) by the lower-level server is identified (in step (c) above). (3) The time for the processing chunk by the upper-level server is used to calculate the processing time by the upper-level server (in steps (d) and (e) above) for the processing by the lower-level server performed during the processing chunk by the lower-level server.

According to the method, the processing time by the upper-level server may be calculated to analyze the operational status, without acquiring the data for associating between a request message and a response message, such as a transaction ID, from the payloads of packets.

The system analysis method may further include the steps of calculating for the specific processing operation the difference between the time when a packet of the specific processing operation request to the lower-level server is received and the time when a packet of the response corresponding to the packet of the processing request is received as a first response time, and subtracting the processing time by the upper-level server, which is stored in the analysis result storing portion in association with the processing ID of the specific processing operation, from the first response time calculated for the specific processing operation to calculate the processing time by the lower-level server for the specific processing operation and storing it in a calculation result storing portion in association with the processing ID of the specific processing operation.

Thus, the processing time calculated for the upper-level server may be used to calculate the processing time by the lower-level server, and the operational status can be analyzed.

The step of calculating may include dividing the difference between the received time of the uplink packet and the received time of the downlink packet, which are stored in the chunk data storing portion in association with the chunk ID, by the number of the processing IDs stored in the inclusion relation data storing portion in association with the chunk ID to calculate the chunk processing time. When there are plural processing chunks by the lower-level server including a processing chunk by the upper-level server, the processing time for the processing chunk by the upper-level server may be equally allocated to the processing chunks by the lower-level servers.

The predetermined condition is a condition that the connections identified from the destination IP addresses, source IP addresses, destination port numbers and source port numbers are the same and the destination port number is the number indicating the communication between a database server and an application server. This is because, in general, plural connections are established among servers, and the packets relating to plural processing operations are transmitted and received in parallel and, without the identification of the delimiters of processing operations on packets on the same connection, packets relating to the processing operations having no relations may be included in one same processing chunk.

The operational status of a system can be analyzed without using a part protected by encryption, for example the payload of the packet, of data communicated between servers within the system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A non-transitory computer readable storage medium storing a system analysis program for analyzing operational status of the system including plural servers performing processing operations in cooperation in accordance with a request from a user terminal, the program causing a computer to execute a procedure, the procedure comprising:

storing a received time of a downlink packet from an upper-level server to a lower-level server for issuing a processing request to the upper-level server in association with the downlink packet into a packet storage portion and a received time of the uplink packet from the lower-level server to the upper-level server in association with the uplink packet into the packet storage portion;

identifying plural combinations of the downlink packet and the uplink packet immediately following the downlink packet under predetermined condition, the uplink packet having a predetermined threshold value or more difference time from the received time of the downlink packet to the received time of the uplink packet;

storing the received time of the uplink packet included in the identified combination and the received time of the downlink packet included in the identified combination following immediately after the identified combination in association with chunk identification data into a chunk data storing portion, the chunks of chunk identification data identifying a chunk data from the uplink packet included in the identified combination to the downlink packet included in the identified combination following immediately after the identified combination;

identifying from the chunk data storing portion the chunk identification data associated with both of the received time of the uplink packet and the received time of the downlink packet, which are included between the time when the packet of a specific processing request to the lower-level server is received and the time when the packet of the response corresponding to the specific processing request is received;

storing the identified chunk identification data into an inclusion relation data storing portion in association with a processing identification data for identifying a specific processing operation to be performed in response to the specific processing request;

calculating chunk processing time by using a difference between the received time of the uplink packet and the received time of the downlink packet, which are stored in the chunk data storing portion, on the basis of the chunk identification data associated with the processing identification data;

calculating the total sum of the chunk processing times to calculate processing time of the upper-level server for the specific processing operation; and storing the total sum of the chunk processing times into an analysis result storing portion in association with the processing identification data of the specific processing operation.

2. The non-transitory computer readable storage medium according to claim 1, the procedure comprising:

calculating the difference between the time when a packet of the specific processing request to the lower-level server is received and the time when a packet of the response corresponding to the packet of the specific processing request is received as a first response time for the specific processing operation;

subtracting the processing time of the upper-level server, which is stored in the analysis result storing portion in association with the processing identification data of the specific processing operation, from the first response time calculated for the specific processing operation to calculate the processing time of the lower-level server for the specific processing operation; and storing the processing time of the lower-level server in a calculation result storing portion in association with the processing identification data of the specific processing operation.

3. The non-transitory computer readable storage medium according to claim 1, wherein, the calculating chunk processing time procedure including dividing the difference between the received time of the uplink packet and the received time of the downlink packet, which are stored in the chunk data storing portion in association with the chunk identification data, by the number of the processing identification data stored in the inclusion relation data storing portion in association with the chunk identification data to calculate the chunk processing time.

4. The non-transitory computer readable storage medium according to claim 1, wherein, the predetermined condition is a condition that the connections identified from the destination IP addresses, source IP addresses, destination port numbers and source port numbers are the same and the destination port number is the number indicating the communication between a database server and an application server.

5. A system analysis apparatus for receiving messages transmitted and received between plural servers performing processing operations in accordance with a request from a user terminal and analyzing the operational status of the system, the apparatus comprising:

a packet data storing portion for storing received time of a downlink packet from an upper-level server to a lower-level server that issues a processing request to the upper-level server in association with the downlink packet and received time of the uplink packet from the lower-level server to the upper-level server in association with the uplink packet;

a chunk analyzing portion for identifying plural combinations of the downlink packet and the uplink packet immediately following the downlink packet under predetermined condition, the uplink packet having a predetermined threshold value or more difference time from the received time of the downlink packet to the received time of the uplink packet for storing the received time of the uplink packet included in the identified combination and the received time of the downlink packet included in the combination following immediately after the identified combination in association with a chunk identification data into a chunk data storing portion, the chunk identification data identifying the chunk data from the uplink packet included in the identified combination to the downlink packet included in the combination following immediately after the identified combination;

a call relation analyzing portion for identifying from the chunk data storing portion the chunk identification data associated with both of the received time of the uplink packet and the received time of the downlink packet, which are included between the time when the packet of a specific processing request to the lower-level server is received and the time when the packet of the response corresponding to the specific processing request is received, and for storing the identified chunk identification data into an inclusion relation data storing portion in association with a processing identification data for identifying a specific processing operation to be performed in response to the specific processing request; and a processing time calculating portion for calculating chunk processing time by using a difference between the received time of the uplink packet and the received time of the downlink packet, which are stored in the chunk data storing portion, on the basis of the chunk identification data associated with the processing identification data, and for calculating the total sum of the chunk processing times to calculate processing time of the upper-level server for the specific processing operation and storing the total sum of the chunk processing times into an analysis result storing portion in association with the processing identification data of the specific processing operation.

6. A system analysis method executed by a computer for receiving messages transmitted and received between plural servers performing processing operations in accordance with a request from a user terminal and analyzing the operational status of a system, the method comprising:

storing received time of a downlink packet from an upper-level server to a lower-level server for issuing a processing request to the upper-level server in association with the downlink packet into a packet storage portion and received time of the uplink packet from the lower-level server to the upper-level server in association with the uplink packet into the packet storage portion;

identifying plural combinations of the downlink packet and the uplink packet immediately following the downlink packet under predetermined condition, the uplink packet having a predetermined threshold value or more difference time from the received time of the downlink packet to the received time of the uplink packet;

storing the received time of the uplink packet included in the identified combination and the received time of the downlink packet included in the identified combination following immediately after the identified combination in association with a chunk identification data into a chunk data storing portion, the chunk identification data identifying a chunk data from the uplink packet included in the identified combination to the downlink packet included in the identified combination following immediately after the identified combination;

identifying from the chunk data storing portion the chunk identification data associated with both of the received time of the uplink packet and the received time of the downlink packet, which are included between the time when the packet of a specific processing request to the lower-level server is received and the time when the packet of the response corresponding to the specific processing request is received storing the identified chunk identification data into an inclusion relation data storing portion in association with a processing identification data for identifying a specific processing operation to be performed in response to the specific processing request;

calculating chunk processing time by using a difference between the received time of the uplink packet and the received time of the downlink packet, which are stored in the chunk data storing portion, on the basis of the chunk identification data associated with the processing identification data;

calculating the total sum of the chunk processing times to calculate processing time of the upper-level server for the specific processing operation; and storing the total sum of the chunk processing times into an analysis result storing portion in association with the processing identification data of the specific processing operation.

* * * * *